United States Patent [19]  
Loizeau

[11] 4,453,838  
[45] Jun. 12, 1984

[54] TORSION DAMPING ASSEMBLY AND RADIALLY DEFORMABLE BEARING THEREFOR

[75] Inventor: Pierre Loizeau, Ville d'Avray, France

[73] Assignee: Valeo, Paris, France

[21] Appl. No.: 333,311

[22] Filed: Dec. 22, 1981

[30] Foreign Application Priority Data

Dec. 22, 1980 [FR] France .................. 80 27215

[51] Int. Cl.³ .............. F16C 27/02; F16C 33/22; F16D 3/14
[52] U.S. Cl. .................. 384/125; 384/202; 384/215; 192/106.2
[58] Field of Search .............. 384/215, 220, 222, 416, 384/125, 202; 464/68; 192/106.2, 106.1

[56] References Cited

U.S. PATENT DOCUMENTS

| 2,941,851 | 6/1960 | Bayer | 384/111 |
| 3,170,736 | 2/1965 | Wright | 384/215 |
| 3,601,459 | 8/1971 | Cutting | 384/222 X |
| 4,212,380 | 7/1980 | Billet | 192/106.2 |
| 4,222,475 | 9/1980 | Fenart | 192/106.2 |

FOREIGN PATENT DOCUMENTS 2807165 8/1978 Fed. Rep. of Germany ........ 464/68

Primary Examiner—Stuart S. Levy  
Assistant Examiner—Thomas R. Hannon  
Attorney, Agent, or Firm—Charles E. Brown

[57] ABSTRACT

A bearing radially interposable between two relative rotatable parts such as the hub and friction disc or annular guide of a clutch plate for an automotive clutch. The bearing has inner and outer bearing surfaces each divided into at least two separate bearing zones. The inner bearing zones are angularly offset relative to the outer bearing zones. Relative radial clearance is defined by radial recesses between the bearing zones of the respective bearing surfaces which prevents additional friction developing between the bearing surface and the associated part and permits radial bending between bearing zones to compensate for limited axial misalignment between the parts. Cutouts in the rim of the bearing provide elastic deformation.

6 Claims, 5 Drawing Figures

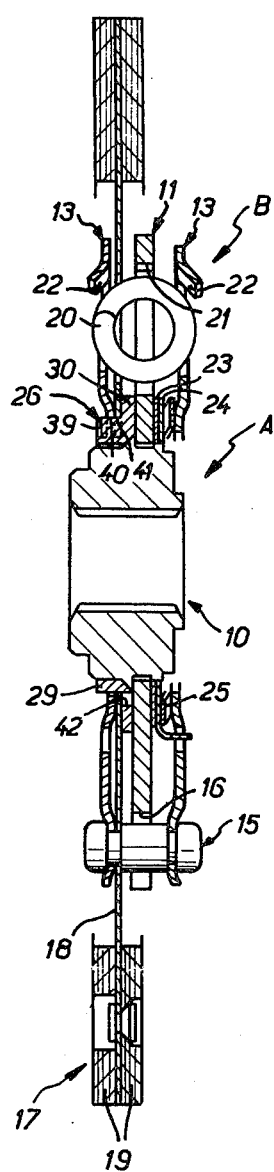
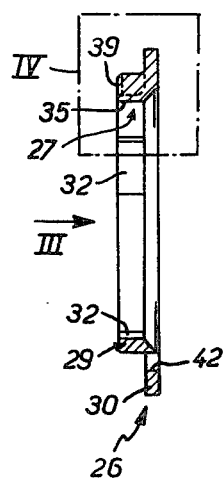
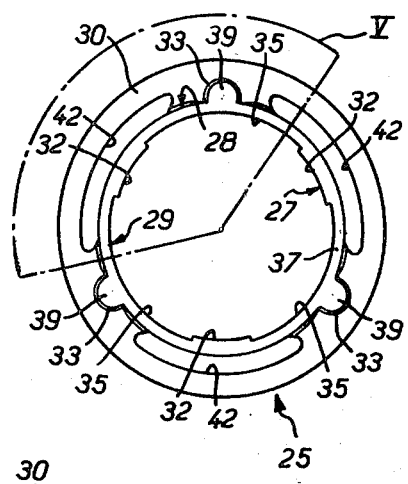
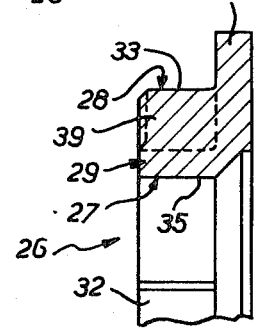
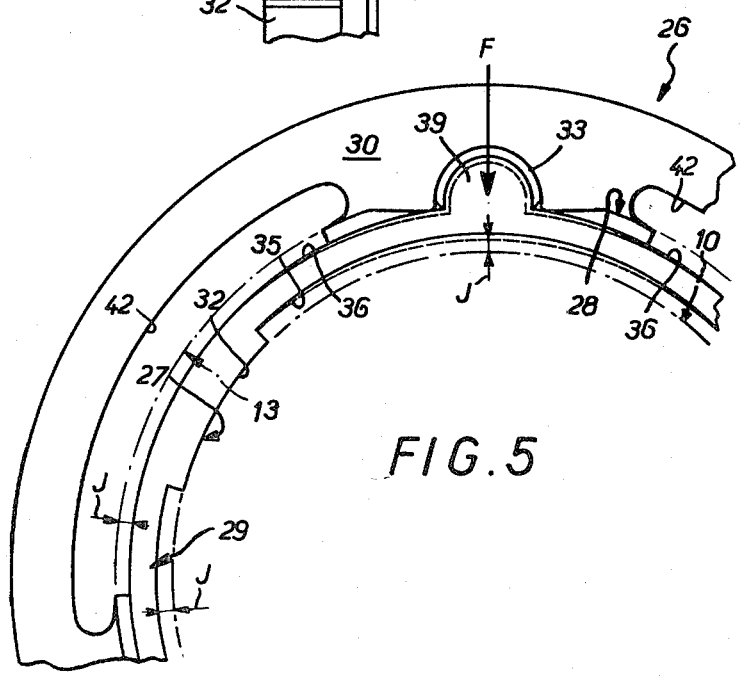

TORSION DAMPING ASSEMBLY AND RADIALLY DEFORMABLE BEARING THEREFOR

BACKGROUND OF THE INVENTION

The present invention relates generally to bearings of the type which are radially interposed between two relatively rotatable parts and comprise an inner bearing surface engaging one of the parts and an outer bearing surface engaging the other part.

Such a bearing is used in particular in torsion damping assemblies comprising at least two coaxial parts relatively rotatable within predetermined limits of angular displacement and resilient means circumferentially interposed between the coaxial parts opposing such relative rotation. The resilient means are radially interposed between two portions of the respective coaxial parts, for example, a hub for one of the coaxial parts and a web, flange or guide ring for the other coaxial part.

As is known such a torsion damping assembly is part of a clutch plate or driven plate of an automotive friction clutch. In this environment one of the coaxial parts is fixed for rotation with a first shaft, in practice the driving shaft, in particular the output shaft of the engine of the vehicle, and the other coaxial part is carried by a hub adapted to be fixed for rotation with a second shaft, in practice the driven shaft, which is the gear box input shaft.

Such a torsion damping assembly provides filtered torque transmission between the coaxial parts when torque is applied to one of the coaxial parts. In other words the circumferentially acting resilient means filter vibrations which may develop along the kinematic chain in which it is arranged, which kinematic chain runs from the engine to the axles of the motor vehicle.

In such a torsion damping assembly, the bearing has the function of centering one of the coaxial parts relative to the other, while avoiding direct contact between the portions of the coaxial parts between which they are interposed. But in service each of the coaxial parts is centered by the shaft to which it is fixed for rotation. Thus, in a motor vehicle clutch plate, this means the engine output shaft and the gear box input shaft. In at least some arrangement these two shafts are not centered relative to each other, and there may be a certain degree of misalignment.

Accordingly, the bearing interposed between the two coaxial parts of the torsion damping assembly may under the effects of relative radial displacement between the coaxial parts be subjected to not insubstantial radial stresses which may be the source of additional spurious friction.

This additional, spurious friction may be sufficient to cancel the action of the circumferentially acting resilient means between the coaxial parts which normally have relatively low stiffness.

Whereupon, in an automotive clutch plate environment, the vibrations which develop when the vehicle idles, commonly known as dead point noise, are not correctly filtered.

OBJECT AND SUMMARY OF THE INVENTION

An object of the invention is to provide a bearing for such an environment which overcomes these drawbacks.

According to the invention there is provided a bearing interposable between two relatively rotatable parts and having an inner bearing surface for engagement with a first bearing part and an outer bearing surface engageable with a second bearing part. The bearing according to the invention is characterized by each of the inner and outer bearing surfaces being divided into at least two inner and outer separate bearing zones, respectively. The inner and outer bearing zones are angularly offset relative to one another. And relative radial play means are formed between each of the bearing zones of a selected one of the bearing surfaces and two circumferentially adjacent bearing zones of the nonselected bearing surface permitting radial elastic deflection between the circumferentially adjacent zones of the nonselected bearing surface.

According to the invention there is also provided a torsion damping assembly for an automotive clutch plate incorporating such a bearing.

According to a preferred embodiment the inner and outer bearing zones are provided on a single annular member. The relative radial play means defined by the radial recesses are formed between adjacent inner bearing zones. In conjunction therewith the inner bearing zones project radially inwardly of the annular member and the outer bearing zones project radially outwardly of the annular member. The annular member also comprises between adjacent bearing zones recesses relative to the bearing zones.

Accordingly, owing to these recesses, when the inner bearing zones of the bearing engage a first part such as a hub, the portion of the annular member between the inner bearing zones is radially spaced from the first part and in conjunction therewith when the outer bearing zones of the bearing engage a second part such as an annular guide, the annular member is radially spaced from the second part between the outer bearing zones.

The first and second parts may therefore be displaced radially relative to each other without any radial jamming occurring between the parts, provided, of course, that the displacement is within the limits of the recesses of the annular member.

There results in effect simple elastic bending or flexure of the annular member between the corresponding bearing zones of the inner and/or outer bearing surfaces.

Since between the inner bearing zones the annular member is therefore not in contact with the part with which its bearing zones are in engagement, no friction is developed other than that normally due to the inner bearing zones.

To be sure, it is known in self-centering release bearings to have at the end of resiliently deformable tabs bearing zones by which a part is engaged on a hub. But other than the fact that the part is not adapted to define in itself a bearing interposable between two rotatable parts, the bearing zones through which there is engagement with the hub are in fact poorly defined since they depend upon the elastic deformation of the tabs. Such is not the case with the present bearing in which the inner bearing zones are not subjected to any deformation and are therefore well defined at all times.

It is also known in certain torsion damping assemblies, particularly for automotive clutch plates, to interpose between the relatively rotatable parts an elastically deformable member forming a bearing. But other than the fact that such an elastically deformable member operates in compression at all times, which is detrimental to long service life, and not in flexure as with the present bearing, which bearing may be made of relatively rigid material such as steel, such an elastically deformable member does not provide at any point solid bearing contact.

On the contrary, the present bearing provides good bearing contact with the interposed parts so that as soon as axial misalignment develops between the parts the bearing is elastically deformed accordingly. The present bearing is for this reason self-centering or self-aligning. Furthermore, owing to its bending or flexural capacity it is advantageously capable to contribute to the filtering of vibrations which are liable to develop between the two relatively rotatable parts.

Finally, the installation of such a bearing in a torsion damping assembly, even a preexisting torsion damping assembly, advantageously does not modify the construction thereof. Otherwise put, the bearing may be used to replace known bearings in torsion damping assemblies.

These and other features and advantages of the invention will moreover be brought out in the accompanying schematic drawings.

BRIEF DESCRIPTION OF THE DRAWINGS

FIG. 1 is a longitudinal sectional view of a clutch plate having a torsion damping assembly incorporating a bearing embodying the invention;

FIG. 2 is a longitudinal sectional view of the bearing taken on its own;

FIG. 3 is an end elevational view taken in the direction of arrow III in FIG. 2;

FIG. 4 shows an enlarged fragmentary longitudinal sectional view of the area included within the phantom line box IV in FIG. 2; and FIG. 5 shows an enlarged fragmentary elevational view of the area included within the phantom line box V in FIG. 3.

DETAILED DESCRIPTION OF THE PREFERRED EMBODIMENT

The drawings illustrate the invention in the environment of clutch plate for an automotive friction clutch, having a torsion damping assembly. The actual clutch plate which is shown in FIG. 1 is not the subject matter of the invention and is well known and therefore will not be described in detail herein. Such a clutch plate is described in detail in U.S. Pat. No. 4,222,475.

In the illustrated embodiment the torsion damping assembly comprises first and second coaxial parts A and B which are relatively rotatably mounted within predetermined limits of angular displacement against the action of resilient means circumferentially interposed therebetween. The first coaxial part A comprises a hub 10 having a web fixed thereto.

The second coaxial part B comprises two annular guides 13 arranged around the hub 10 with one on each side of the hub web 11 spaced therefrom. The annular guides 13 are fixed to each other by spacers 15 extending with clearance through apertures 16 in the periphery of the hub web 11 and parallel to the axis of the clutch plate.

As this is a clutch plate, a friction disc 17 is fixed for rotation with the second coaxial part B. The friction disc 17 comprises a web or plate 18 adjoining one of the annular guides 13 and fixed thereto by the spacers 15 interconnecting the annular guides 13. Friction facings 19 are fixed at the outer periphery of the web 18 to each side thereof.

In the illustrated embodiment the resilient means circumferentially interposed between the coaxial parts A and B comprise a plurality of coil springs 20 extending generally chordally of the clutch plate. Each of the coil springs 20 is housed partly in openings or windows 21 in the hub web 11 and partly in openings or windows 22 in annular guides 13.

On the other side of the friction disc 17 a friction washer 23 is provided axially between the hub web 11 and the adjacent annular guide 13 in contact with the hub web 11. The friction washer 23 is carried by a support or backing washer 24 which is biased by an axially acting spring washer 25 such as an Onduflex washer, bearing against the annular guide 13.

On the other side of the hub web 11, that is the side of the hub web 11 facing the friction disc 17, a bearing 26 is radially interposed between the hub 10 which is a component of the first coaxial part A and the web 18 of the friction disc 17 and the annular guide 13 adjoining the friction disc web 18 which together are components of the second annular part B.

As is known per se the bearing 26 comprises an inner bearing surface 27 for engagement on the hub 10 and an outer bearing surface 28 for engagement with the annular guide 13 concerned and the web 18 of the friction disc 17.

The inner and outer bearing surfaces 27 and 28 are in practice formed on a single annular member 29 which is axially elongated and to one side of which is an integral outwardly extending peripheral rim 30 which is inserted between the hub web 11 and the friction disc web 18 for maintaining the axial position of the assembly.

In accordance with the invention and in conjunction with the above, the inner bearing surface 27 of the bearing 26 is circumferentially divided into at least two separate inner bearing zones 32 and the outer bearing surface 28 is also divided into at least two separate outer bearing zones 33.

Preferably, three inner bearing zones 32 are provided at 120° to one another and likewise three outer bearing zones 33 are provided also at 120° to one another.

According to the invention the inner bearing zones 32 are angularly offset or circumferentially staggered relative to the outer bearing zones 33.

Preferably, as shown, the circumferential distances from each bearing zone 32, 33 of each of the bearing surfaces 27, 28 to the two circumferentially adjacent bearing surfaces 33, 32 of the other bearing surfaces 28, 27 are equal.

In the illustrated embodiment the relative radial play means result from the fact that the inner bearing zones 32 project radially inwardly with radial recesses 35 therebetween and in conjunction therewith the outer bearing zones 33 project radially outwardly likewise with radial recesses 36 therebetween. In other words the annular member 29 has circumferentially alternating inner bearing surfaces 32 projecting radially inwardly and outer bearing surfaces 33 projecting radially outwardly.

In the illustrated embodiment the inner bearing zones are part cylindrical, all lying on the common cylindrical surface defined by the inner bearing surface 27. Complementarily, the outer bearing zones 33 are similarly part cylindrical all lying on the common cylindrical surface defined by the outer bearing surface 28. But for fixing the bearing 26 for rotation with the second coaxial part B in the middle of each outer bearing zone 33 is provided a lobe 39 of part cylindrical contour which lobe 39 is received in complementary notches 40, 41 formed in the inner periphery of the annular guide 13 concerned and the friction disc web 18.

Finally, in line with each of the inner bearing zones 32 the rim 30 comprises a cutout or opening 42 circumferentially extending to either side of the corresponding inner bearing zone 27 and slightly beyond the circumferentially adjacent outer bearing zones 28. The rim 30 is locally radially disconnected from the rest annular member 29.

As will be easily understood the bearing 27 thus constructed bears only through its inner bearing zones 32 against the hub 10 and as best seen in FIG. 5 where the hub 10 is shown in phantom lines, the annular member 29 of the bearing 26 is at a distance from the hub 10 between adjacent bearing zones 27, defining a radial play J normally existing between the annular member 29 and the hub 10.

Likewise, the annular guides 13 are in contact with the bearing 26 only through the outer bearing zones 33. As best seen in FIG. 5 in which the annular guides 13 are shown in phantom lines the annular member 29 of the bearing 26 is at a distance from the annular guides 13 defining radial play normally existing between the annular member 29 and the annular guides 13. In the illustrated embodiment the last-mentioned radial play is likewise equal to J.

Thus, owing to such radial play J, if in operation one of the outer bearing zones 33 is subjected to radial forces in the direction of arrow F in FIG. 5, due to the second coaxial part B, the annular member 29 undergoes elastic deformation by local bending or flexure causing it to come closer to the hub 10 as shown by dashed line in FIG. 5. But provided the corresponding radial play J is sufficient, this elastic deformation does not cause the annular member 29 to come into contact with the hub 10 between adjacent inner bearing zones 32. Accordingly, no additional or spurious friction develops.

Thus it will be understood that the cutouts or openings 42 in the rim 30 contribute to the ability of the annular member 29 to deform elastically between two adjacent inner bearing zones 32.

In practice, to achieve the sought after centering, the bearing embodying the invention may be dimensioned so that to be in play free, snug engagement with the hub 10, its ability to deform elastically advantageously providing such snug engagement. As the hub is thus advantageously well balanced it is not the source of any stressing.

Obviously the present invention is not intended to be restricted to the illustrated and described embodiment but encompasses all variations and alternatives which will be understood to those skilled in the art, without departing from the spirit and scope of the invention. Such is for example the case as regards the number and/or configuration of the bearing zones and their relative angular relationship. Furthermore the invention is not limited to torsion damping assemblies, and a fortiori to such torsion damping assemblies which are incorporated into clutch plates of automotive friction clutches. On the contrary it may be used in any arrangement in which two parts are rotatably mounted relative to each other.

What I claim is:

1. A bearing radially interposable between two relatively rotatable parts, said bearing comprising an inner bearing surface engageable with a first relatively rotatable part, and an outer bearing surface engageable with a second relatively rotatable part, said inner and outer bearing surfaces being divided into at least two inner and outer bearing zones respectively, said inner and outer bearing zones being part of a single annular member, said inner bearing zones projecting radially inwardly of said annular member and said outer bearing zones projecting radially outwardly of said annular member, said inner and outer bearing zones being angularly offset relative to one another, relative radial play means being formed between each of said bearing zones of a selected one of said bearing surfaces and two circumferentially adjacent bearing zones of the nonselected bearing surface and between each of said bearing zones of the nonselected one of said bearing surfaces and two circumferentially adjacent bearing zones of the selected one of the bearing surfaces, relative radial play means comprising inwardly opening radial recesses formed between adjacent inner bearing zones and outwardly opening radial recesses between adjacent outer bearing zones, said radial play means permitting radial elastic deflection between said circumferentially adjacent bearing zones of said bearing surfaces and a radially outwardly extending rim integral with said annular member, wherein said rim comprises cutouts circumferentially extending to each side of said inner bearing zones radially locally disconnecting said rim with the rest of said annular member.

2. A bearing according to claim 1, wherein said bearing is of one-piece construction.

3. A bearing according to claim 1, wherein the radial depth and configuration of said recesses prevent contact along said nonselected bearing surfaces between circumferentially adjacent bearing zones thereon in case of misalignment between the relatively rotatable parts.

4. A bearing according to claim 1, wherein each of said cutouts extends at least into the vicinity of said outer bearing zones circumferentially adjacent the corresponding inner bearing zone.

5. A bearing according to claim 1, wherein each of said cutouts extends radially to the radial level of the junction of said rim with the rest of said annular member.

6. A bearing according to claim 1, wherein three said inner bearing zones angularly spaced 120° from one another and three said outer bearing zones angularly spaced 120° from one another are provided, the circumferential distances from each of said bearing zones on one of bearing surfaces to circumferentially adjacent bearing zones on the other of said bearing surfaces are substantially equal.

* * * * *